US008126582B2

(12) United States Patent
Kaneko et al.

(10) Patent No.: US 8,126,582 B2
(45) Date of Patent: Feb. 28, 2012

(54) MEDICINE TRIAL PRODUCTION SUPPORTING SYSTEM

(75) Inventors: Nobuya Kaneko, Tokyo (JP); Shunichi Gomi, Nobeoka (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 10/517,381

(22) PCT Filed: Jun. 12, 2003

(86) PCT No.: PCT/JP03/07497
§ 371 (c)(1),
(2), (4) Date: Aug. 22, 2005

(87) PCT Pub. No.: WO03/107236
PCT Pub. Date: Dec. 24, 2003

(65) Prior Publication Data
US 2006/0069461 A1    Mar. 30, 2006

(30) Foreign Application Priority Data

Jun. 12, 2002  (JP) .................... 2002-172006

(51) Int. Cl.
*G06F 19/00*  (2011.01)
(52) U.S. Cl. ............. 700/117; 700/96; 700/95; 702/27; 264/40.1
(58) Field of Classification Search .................. 700/117, 700/96, 95; 702/27; 264/40.1
See application file for complete search history.

(56) References Cited

U.S. PATENT DOCUMENTS

| 7,039,606 | B2 * | 5/2006 | Hoffman et al. | 705/26 |
| 2003/0069795 | A1 * | 4/2003 | Boyd et al. | 705/22 |
| 2003/0093229 | A1 * | 5/2003 | Wang Ho | 702/27 |
| 2005/0197786 | A1 * | 9/2005 | Kataria et al. | 702/19 |

FOREIGN PATENT DOCUMENTS

| JP | 2002-108989 | 4/2002 |
| TW | 442743 | 6/2001 |
| WO | WO 00/79453 A2 | 12/2000 |
| WO | WO 01/65441 | * 9/2001 |
| WO | WO 01/65441 A | 9/2001 |

OTHER PUBLICATIONS

Office Action issued by Taiwanese Patent Office for Taiwanese Patent Application No. 92115995, dated May 4, 2005.
Supplemental European Search Report dated May 24, 2006 in corresponding European Patent Application No. 03736185.4.
Supplementary European Search Report dated Aug. 16, 2006 in Corresponding European Patent Application No. 03736185.4.
Office Action dated May 14, 2007 in corresponding European Patent Application No. 03736185.4.

* cited by examiner

*Primary Examiner* — Kakali Chaki
*Assistant Examiner* — Tejal Gami
(74) *Attorney, Agent, or Firm* — Finnegan, Henderson, Farabow, Garrett & Dunner, L.L.P.

(57) ABSTRACT

A computer system (100), an ingredient manufacturer system (200), and composition manufacturers can be connected online, and a system of the ingredient manufacturer obtains composition information from a system (300), and provides it for the system (100). At this time, an estimated product property and production cost can be provided.

6 Claims, 5 Drawing Sheets

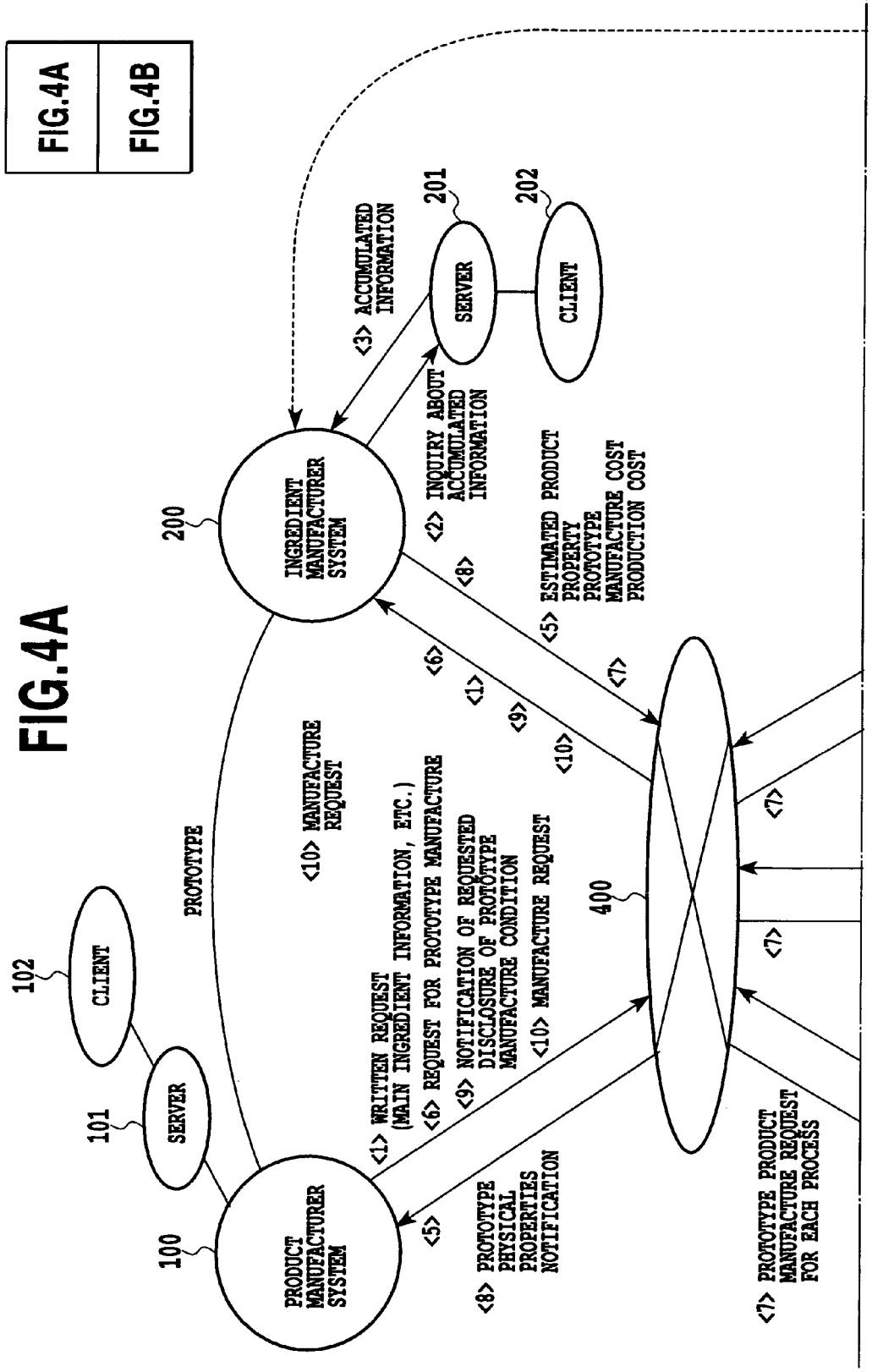

MEDICINE TRIAL PRODUCTION SUPPORTING SYSTEM

TECHNICAL FIELD

The present invention relates to a medicine prototype support systems and methods for supporting product information and ingredient transactions between a product manufacturer and an ingredient manufacturer, such as, for example, a medicine prototype support systems and method for supporting a transaction between a product manufacturer of a composition formed by one main active medical ingredient and a manufacturer of an ingredient forming part of a composition.

BACKGROUND ART

Conventionally, a composition product manufacturer (hereinafter referred to as a product manufacturer, for example, a pharmaceutical company) is mainly engaged in manufacturing the main ingredient (for example, an efficacy ingredient) of the composition, and requests a composition ingredient manufacturer (hereinafter referred to as an ingredient manufacturer) to manufacture and provide other composition ingredients (for example, an excipient for forming a tablet appropriate for the efficacy ingredient) appropriate for the main ingredient.

In this case, it is rare that a user is informed of the optimum composition ingredient for a predetermined efficacy ingredient from the beginning, and a product manufacturer selects the optimum composition ingredient based on the manufacture of a sample product and its evaluation from a combination of a plurality of composition ingredients regarded as candidates. However, it is necessary to accumulate the knowledge of various composition ingredients and a composition manufacturing method using them for the combination of the optimum main ingredient with other composition ingredients, and it is not always easy for a product manufacturer.

For example, the contents of a process of exchanging information among a product manufacturer, an ingredient manufacturer, and a contract composition manufacturer (hereinafter referred to as a composition manufacturer) are practically explained below by referring to FIG. 1.

<1> When a product manufacturer manufactures a new medicine, the manufacturer asks the ingredient manufacturer about the information about the properties, etc. of the necessary composition ingredients a, b, c, . . . for the manufacture.

<2> The ingredient manufacturer checks the information about the asked composition ingredient, and presents (returns as an answer) the information to the product manufacturer.

<3> The product manufacturer prepares a sample, and evaluates it. When a better evaluation cannot be obtained, the processes <1> to <3> are repeated.

<4> The finally determined ingredient is indicated as a composition ingredient to be purchased to the ingredient manufacturer.

<5> The ingredient manufacturer sells the indicated ingredient to the product manufacturer.

<6> The product manufacturer delivers the purchased ingredient to the composition manufacturer, discloses the prescription, and commits production of the product.

<7> The composition manufacturer performs contract manufacture.

<8> A manufactured product is supplied to the product manufacturer.

A product manufacturer has to repeatedly exchange information with an ingredient manufacturer and a composition manufacturer, and it has been the problem to be solved that a laborious job is to be performed in exchanging information for manufacture of a product. Especially, when a new medicine is developed, it has been difficult to request an external organization to develop it while maintaining the security of the main ingredient (important ingredient) of the medicine to be developed.

DISCLOSURE OF THE INVENTION

The present invention directs to provide a medicine prototype support system and method capable of supporting a product manufacturer detecting the optimum other composition ingredients for a main ingredient and combinations of them in cooperation with the ingredient manufacturer or the composition manufacturer, and realizing a quick transaction between a product manufacturer and a related manufacturer.

According to the first embodiment of the present invention includes: a first system which includes input means for inputting information, output means for outputting information, and communications means for transmitting information input from the input means and receiving information to be output by the output means, and is used by a product manufacturer; a second system which includes input means for inputting an information, output means for outputting information, and communications means for transmitting information input from the input means and receiving information to be output by the output means, and is used by an ingredient manufacturer; and a third system which accumulates composition information relating to a composition of a product, can provides the output means of the second system with composition information at a retrieval request transmitted from the second system, and is used by a composition manufacturer, wherein main ingredient information relating to a main ingredient of a product composition is input from the input means of the first system, the main ingredient information is output to the output means of the second system through the communications means of the first system and the second system, ingredient information about a product composition ingredient and a retrieval request are input from the input means of the second system, accumulated composition information about the ingredient information is obtained from the third system and output from the output means of the second system, estimated product property information and estimated product production cost information determined according to the output accumulated information are input from the input means of the second system and transferred through the communications means of the first system and the second system, and output from the output means of the first system.

The second embodiment of the invention is based on the medicine prototype support system of the first embodiment, wherein after the estimated product property information and estimated product production cost information are output from the output means of the first system, a prototype manufacture request input from the first system is output from the output means of the second system through the communications means of the first system and the second system, the information about at least the properties of the prototype is input from the input means of the second system as the information about the manufacture of a product, and the input information about the manufacture is output from the output means of the first system through the communications means of the first system and the second system.

The second embodiment of the present invention is a medicine prototype supporting method used among a first system which is capable of inputting and outputting information, has communications capabilities, and is used by a product manufacturer, a second system which is capable of inputting and outputting information, has communications capabilities, and is used by an ingredient manufacturer, and a third system which accumulates composition information about the composition of a product, can provide the second system with composition information according to a retrieval request transmitted from the second system, and is used by a composition manufacturer wherein main ingredient information relating to a main ingredient of a product composition is input from the first system, the main ingredient information is transferred and output to the second system through the communications capabilities of the first system and the second system, ingredient information about a product composition ingredient and a retrieval request are input from the second system, accumulated composition information about the ingredient information is obtained from the third system and output from the second system, estimated product property information and estimated product production cost information determined according to the output accumulated information are input from the second system and transferred through the communications capabilities of the first system and the second system, and output from the first system.

The fourth embodiment of the invention is based on the medicine prototype supporting method of the third embodiment, wherein after the estimated product property information and estimated product production cost information are output from the first system, a prototype manufacture request input from the first system is output from the second system through the communications means of the second system, the information about at least the properties of the prototype is input from the second system as the information about the manufacture of a product, and the input information about the manufacture is output from the first system through the communications capabilities of the first system and the second system.

The fifth embodiment of the invention includes: a first system which has input means for inputting information, output means for outputting information, and communications means for transmitting the information input from the input means and receiving information to be output by the output means, and is used by a product manufacturer; and a second system which accumulates composition information about the composition of a product, has input means for inputting information, output means for outputting information, and communications means for transmitting information input from the input means and receiving information to be output by the output means, and is used by an ingredient manufacturer, wherein main ingredient information relating to the main ingredient of a product composition is input from the input means of the first system, the main ingredient information is output to the output means of the second system through the communications means of the first system and the second system, ingredient information about composition ingredient and a retrieval request are input from the input means of the second system, accumulated composition information about the ingredient information is obtained from the second system at the retrieval request and output from the output means of the second system, and estimated product property information and estimated product production cost information determined according to the output accumulated information are input from the input means of the second system, transferred through the communications means of the first system and the second system, and output from the output means of the first system.

The sixth embodiment of the invention is a medicine prototype support system for an ingredient manufacturer developing medicines at a request of a product manufacturer which includes a product manufacturer system of the product manufacturer, an ingredient manufacturer system of the ingredient manufacturer, and a plurality of composition manufacturer systems of composition manufacturers which the ingredient manufacturer requests to manufacture a composition connected through communications means, wherein the product manufacturer system has transmission means for transmitting at least main ingredient information about a medical product to the ingredient manufacturer system, the ingredient manufacturer system has a database storing main ingredient information and composition ingredient information, composition ingredient determination means for determining composition ingredient information about a medical product to be developed according to the main ingredient information from the product manufacturer system based on the database, and transmission means for transmitting resultant composition ingredient information from the composition ingredient determination means to the plurality of composition manufacturer systems, and the plurality of composition manufacturer systems has transmission means for transmitting composition manufacture information about the manufacture of a part of a manufacture process of the medical product to the ingredient manufacturer system.

The seventh embodiment of the invention is based on the medicine prototype support system sixth embodiment, wherein the main ingredient information about the database of the ingredient manufacturer system is ranked depending on the security level, and when main ingredient information at a high security level is transmitted to the composition manufacturer system, the information is transmitted after being at least once converted by information conversion means.

The eighth embodiment of the invention is based on the medicine prototype support system of the sixth embodiment, and further includes information conversion means for conversion from main ingredient information to another type of information which does not allow the main ingredient information to be estimated in a database of the ingredient manufacturer system.

BRIEF DESCRIPTION OF THE DRAWINGS

FIG. 4 is a diagram showing the relationship of FIGS. 4A and 4B;

FIG. 4A is a block diagram of the configuration of the system according to another embodiment of the present invention;

BEST MODE FOR CARRYING OUT THE INVENTION

The embodiments of the present invention are described below in detail by referring to the attached drawings.

Figure 1:
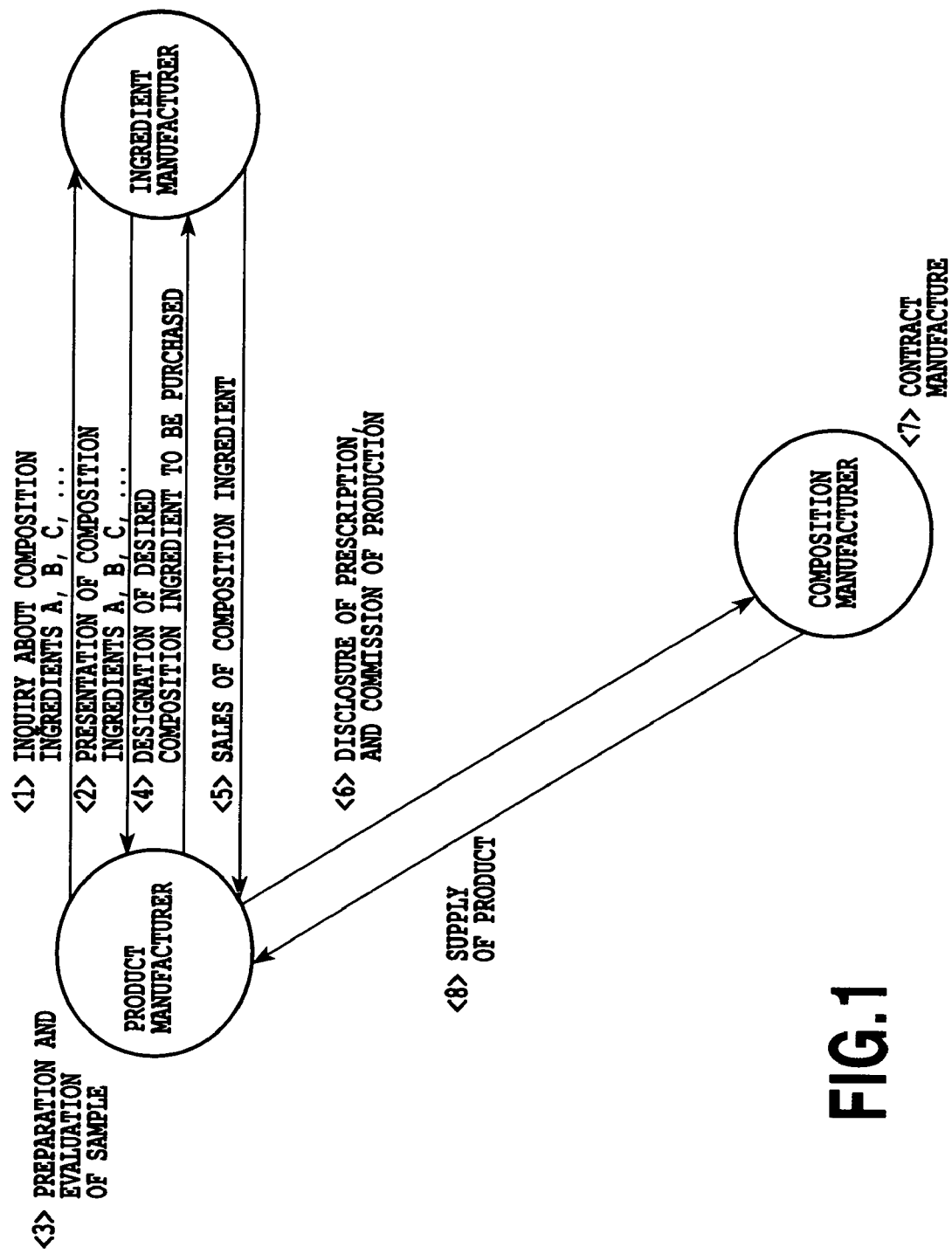
FIG. 1 is an explanatory view of the conventional flow of information.
Figure 2:
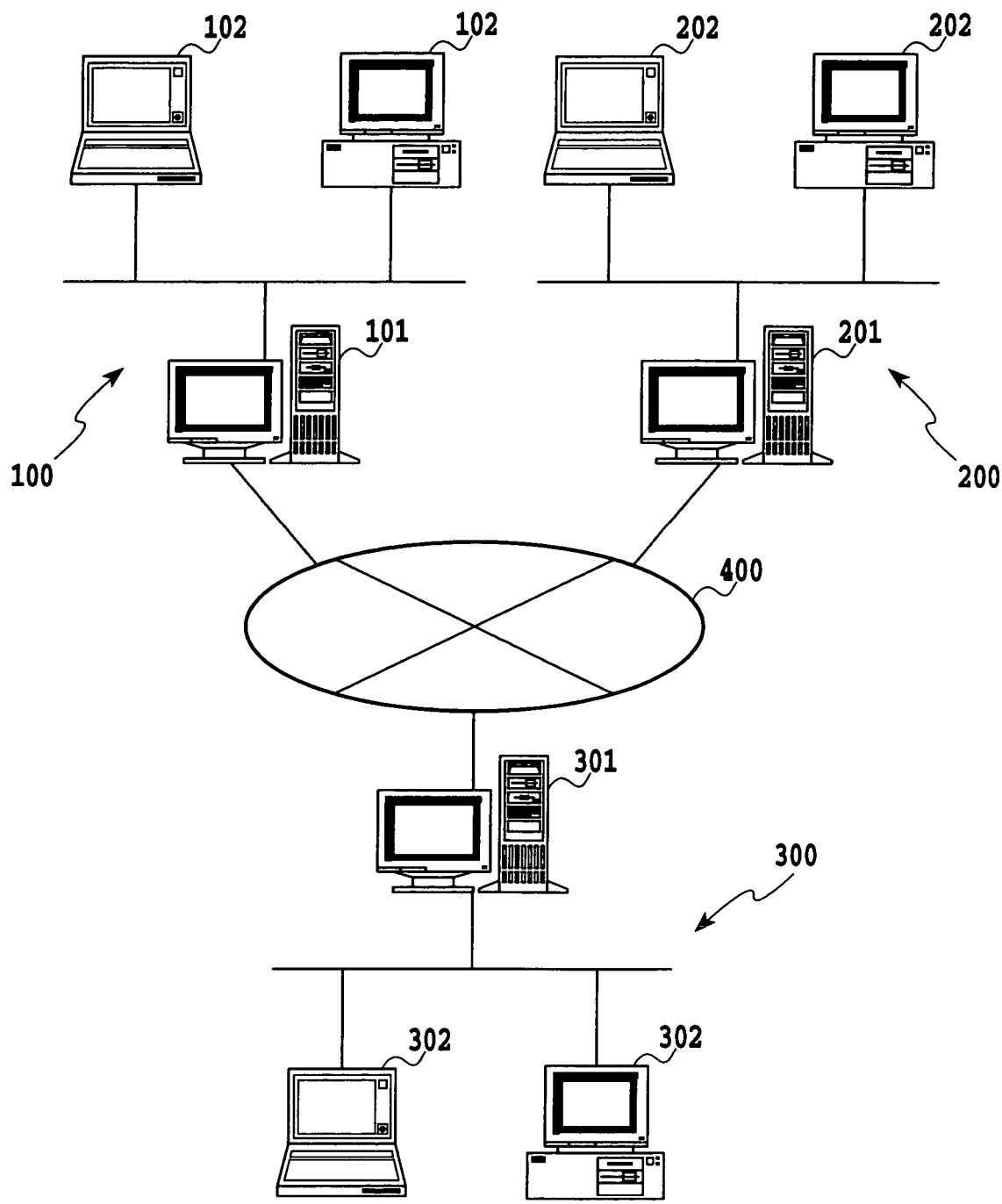
FIG. 2 is a block diagram of the configuration of the system according to an embodiment of the present invention.

FIG. 2 shows the entire configuration of the medicine prototype support system applicable to the embodiment described later. In FIG. 2, a computer system 100 (hereinafter referred to simply as a system) used by a product manufacturer and has a communications server 101 and one or more clients 102 LAN-connected to the communications server 101. The communications server 101 transfers the information transmitted from the client 102 to the ingredient manufacturer system 200. The client 102 can use a personal computer, etc., and is loaded with software for electronic mail and a browser for browsing a home page (an HTML document, etc.). The client 102 inputs the information to be transmitted to the client of another system described later, and displays the information received from another system.

An ingredient manufacturer system 200 has a communications server 201 and a plurality of clients 202 LAN-connected to the communications server 201. The functions of the communications server 201 and the clients 202 can be considered to be the same as those of the above-mentioned communications server 101 and the client 102. The communications server 201 stores in the internal storage device, for example, in the hard disk storage device the information (generally called property information) to be presented to the product manufacturer including properties, etc. depending on the type of a composition ingredient.

Furthermore, the communications server 201 is loaded with an estimating program for calculation of a manufacture price and a manufacture condition according to the information about the type and amount, etc. of a composition ingredient. Furthermore, the communications server 201 is loaded with a program for a read of the accumulated information accumulated in the communications server (described later) of a composition manufacturer.

In an estimating program, a calculating expression for a manufacture cost using the quantity as a parameter is predetermined for each type of composition ingredient. By the calculating expression, a manufacture cost can be calculated in the program. Since a program for remotely reading accumulated information (what is called data of a database) is marketed, a commonly marketed program can be used.

A composition manufacturer system 300 has a communications server 301 and a plurality of clients 302 LAN-connected to the communications server 301. The functions of the communications server 301 and the clients 302 can be considered to be similar to those of the communications server 101 and the client 102. However, the storage device of the composition manufacturer system 300 is loaded with a well-known database management program for offering accumulated information at an inquiry of accumulated information, that is, a query (retrieval request) from the ingredient manufacturer system 200. The accumulated information refers to the information relating to the properties of the composition (possibly including the entire product) obtained by combining a plurality of composition ingredients and the manufacture condition (the above two pieces of information can be generally called composition information).

A communications network 400 is a communications network which can be connected to the systems 100 to 300. For example, any well-known communications network can be used regardless of a dedicated telephone line called the Internet, wireless, or cable.

First Embodiment

Figure 3:
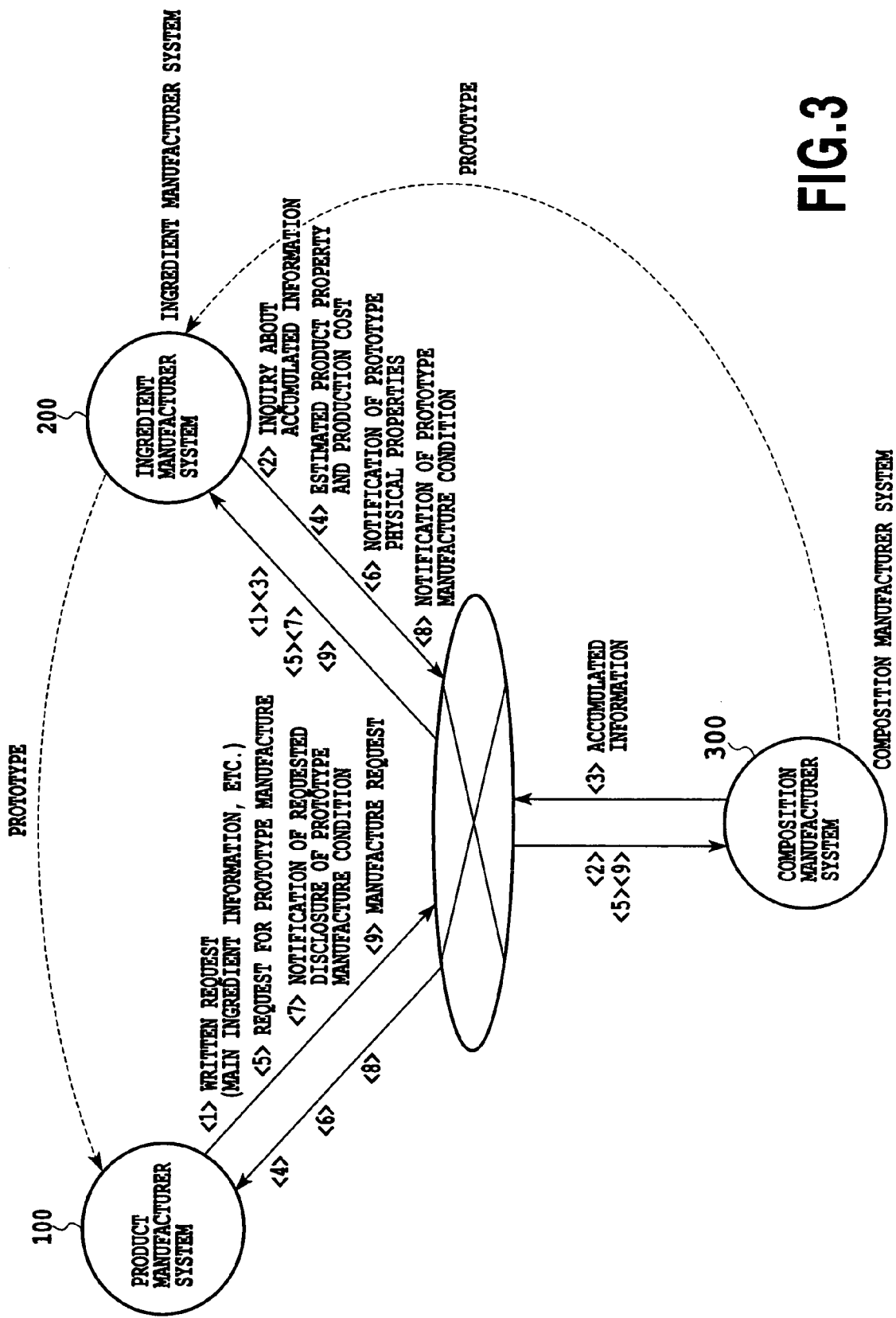
FIG. 3 is an explanatory view of the flow of information according to an embodiment of the present invention.

The procedure of the first embodiment is explained by referring to FIG. 3.
(Process 1)
The staff of product manufacture of a product manufacturer inputs a written request from the client 102, that is, a written request (<1> shown in FIG. 3) for providing a product composition to attain the desired properties of the product X including a manufactured main ingredient X1 and a manufacturing method, and transmits it to the ingredient manufacturer system 200. A request item from the product manufacturer can be the designation of the main ingredient X1, a desired item and value of a product, and also product style, a desired product cost, the restrictions on the manufacture condition, the restrictions on a used ingredient, etc.

When the main ingredient X1 is generally difficult to acquire, it is necessary for a product manufacturer to provide the main ingredient X1 for an ingredient manufacturer. In some cases, a substance similar to the main ingredient X1 is provided.
(Process 2)
A sales staff of an ingredient manufacturer receives a written request at the clients 202 through the communications server 201. Using one or more of clients 202, the sales staff inputs a retrieval request about the composition ingredient relating to the main ingredient described in the written request (<2> shown in FIG. 3) and acquires the information (composition information) about the main ingredient X1 accumulated in the communications server 301 of the composition manufacturer system 300 or various product composition formed by the ingredient similar in properties to it, and the properties and the manufacture condition attained by them (<3> shown in FIG. 3). Furthermore, the product composition containing the composition ingredient X2 manufactured by the ingredient manufacturer and the manufacture condition are obtained according to the accumulated information in the communications server 301. Additionally, the information about the properties, etc. of a product is obtained from the accumulated information in its own communications server 201 or the communications server 301 of the composition manufacturer system 300 of the composition manufacturer. Thus, the properties of an estimated product are determined. Then, the sales staff inputs information (information about composition ingredient, quantity, etc.) for estimation from the clients 202, uses an estimating program of the communications server 201, and calculates the manufacture cost, and the product cost. When the product has legal restrictions on a substance available as a composition ingredient, the composition and the production cost should be determined within the range of the restrictions.
(Process 3)
The information about the determined estimated product property and production cost is input from the clients 202, and transmitted to the client 102 of the staff of product manufacture of the product manufacturer through the communications servers 201 and 101 (<4> shown in FIG. 3).
(Process 4)
The staff of product manufacture considers the transmitted estimated product property and sales cost to prepare a written request for prototype manufacture. A written request for prototype manufacture (<5> shown in FIG. 3) is input from the client 102, and transmitted to the clients 202 of the sales staff of the ingredient manufacturer through the communications servers 101 and 201. The sales staff transfers a written request for prototype manufacture to the clients 302 through the communications servers 201 and 301.

At this time, the ingredient manufacturer discloses the product composition and the manufacture condition to the composition manufacturer. For example, the ingredient manufacturer provides the information about the main ingredient X1 and another composition ingredient X2 for the composition manufacturer. Thus, when the ingredient manufacturer requests the composition manufacturer to manufacture a prototype, it is desired that a confidential contract is made between the ingredient manufacturer and the composition manufacturer on the product composition, the manufacture condition, etc. Furthermore, when an ingredient manufacturer can manufacture a prototype, the manufacture department, etc. belonging to the ingredient manufacturer has the function of the composition manufacturer in FIG. 3.
(Process 5)

The composition manufacturer receives a request to manufacture a prototype, manufactures it, and delivers it to the ingredient manufacturer (refer to the dotted line shown in FIG. 3).
(Process 6)

The ingredient manufacturer measures the properties of the prototype. In some cases, the composition manufacturer measures the property values of the prototype, and can deliver the prototype including the information. The process 6 in this case is performed by the composition manufacturer.
(Process 7)

The ingredient manufacturer provides a prototype for a product manufacturer (refer to the dotted line shown in FIG. 3.). The information (<6> shown in FIG. 3) about the (measured) properties of the prototype is transmitted from the clients 202 of the sales staff of the ingredient manufacturer to the client 102 of the product manufacturer. At this time, it is noticeable that the information about the composition and the manufacturing method are not disclosed. If a prototype is analyzed, and the composition and the manufacture condition are easily estimated, it is necessary to take action like a contract etc. not to analyze the product composition between the product manufacturer and the ingredient manufacturer.
(Process 8)

The product manufacturer measures the properties of the provided prototype, and determines whether or not the disclosure of the information about the composition and manufacture condition of prototype is required (the disclosure of the information about the composition and the manufacture condition of a prototype is requested). Then, the result is transmitted to the clients 202 as a sales staff of the ingredient manufacturer (refer to <7> shown in FIG. 3).
(Process 9)

When the ingredient manufacturer receives a notification from the manufacture staff of the product manufacturer that the information is to be disclosed, the sales staff discloses the information by transmitting the information about the product composition and the manufacture condition of a prototype from the clients 202 to the client 102.

When the product manufacturer manufactures a product, the order (manufacture request as indicated by <9> shown in FIG. 3) of the composition ingredient X2 sold by the ingredient manufacturer is made from the client 102 of the manufacture staff to the clients 202 as the sales staff. The ingredient manufacturer receives the order, and manufactures the composition ingredient X2, or sells it when there is the ingredient in stock. When the product manufacturer does not manufacture the product, it can be committed on the composition manufacturer. The commission can be performed through an online operation.

The prototype is provided and the payment and the reception of the price for the related information, etc. occur at any time depending on each style. For example, before starting the manufacture of a prototype, an estimated property value and a sales cost are presented to the product manufacturer, and the payment and reception of the price for the preparation of a prototype can occur. Furthermore, when the property information and manufacturing method information are to be purchased after presenting a prototype, the payment and reception of the price also occur. Additionally it is natural that the exchange of the price for the manufacture of a prototype occurs between the product manufacturer and the ingredient manufacturer.

These prices can be processed online (that is, accounting process). Practically, the communications server 101 of the product manufacturer system performs the process of transferring the amount set in advance to the bank account of the ingredient manufacturer each time necessary information is received from the ingredient manufacturer system 200. The payment of a fund can be performed by a bank transfer or using electronic money, etc.

The practical communications method according to the first embodiment is briefly explained below.

Various communicating means such as electronic mail, file transfer (FTP), etc. can be used for the communications of the information among the staffs of the product manufacturer, the ingredient manufacturer, and the composition manufacturer.

It is not necessary that the above-mentioned staffs are the same persons, but can be any appropriate persons in the sales, development, manufacture, and other departments as proxy agent.

The information input means of the clients 102 and 202 can be a keyboard, a floppy disk (registered trademark), other storage devices, communications devices for inputting information from other devices through communications, etc.

The information output means of the clients 102 and is 202 can be a printer, a floppy disk (registered trademark), other storage devices, communications devices for outputting information through communications, etc.

Second Embodiment

The above-mentioned first embodiment has the novelty in an ingredient manufacturer obtaining the accumulated information about the system of the composition manufacturer, and providing the product manufacturer with the information desired by the product manufacturer. While the load of the product manufacturer is reduced, the information inputting operation of the ingredient manufacturer increases. Therefore, the manual operation of the ingredient manufacturer can be automated in the second embodiment as described below.

In this embodiment, an HTML document for display of the screen for input on the product manufacturer side to the communications server 201 of the ingredient manufacturer and the screen (information output screen) for display of the information received from the ingredient manufacturer is stored. The client 102 on the product manufacturer side uses a browser and displays the HTML document (information input screen) on the display screen of the client 102. On the information input screen, the main ingredient and the ingredient information about other composition ingredients shown in FIG. 3 (<1>), the prototype manufacture request (<5>), a request to disclose the prototype manufacture condition, etc. (<7>), and a manufacture request (<9>) are input.

The staff of the ingredient manufacturer uses the browser of the clients 202 and displays the input screen to confirm the input information on the product manufacturer side. Upon receipt of the main ingredient and the ingredient information about other composition ingredient, the communications server 201 automatically activates an estimating program, estimates a sales cost, and displays the result on the information output screen.

The process of retrieving necessary information from the accumulated information of the composition manufacturer system 300 can also be automatically performed by a database retrieval program.

The estimated product property can be generated by a dedicated program by combining the information obtained from the composition manufacturer system 300 with the accumulated information about the ingredient manufacturer system 200, processing the result, and displaying it on the information output screen.

Furthermore, the accumulated information accumulated in the composition manufacturer system 300 and the information relating to the composition accumulated by the ingredient manufacturer can be accumulated in the accumulation means in the ingredient manufacturer system 200 of the ingredient manufacturer, for example, in a hard disk so that the information relating to the composition can be retrieved from the accumulation means and used (corresponding to the invention according to claim 5).

In the composition manufacturer system ingredient manufacturer system 200 in the embodiment above, the information about the properties of the composition ingredient is accumulated, but the main ingredient information or other composition ingredient information or both of them can be used as a query for retrieval of the accumulated information.

The above-mentioned program can be easily prepared by those skilled in the art based on the explanation of the specifications.

In addition to the product manufacturer, the ingredient manufacturer, the composition manufacturer, a proxy agent, such as, for example, a trading company, can be included in embodiments consistent with the present invention.

The third embodiment of the present invention is explained below by referring to the attached drawings.

Figure 4B:
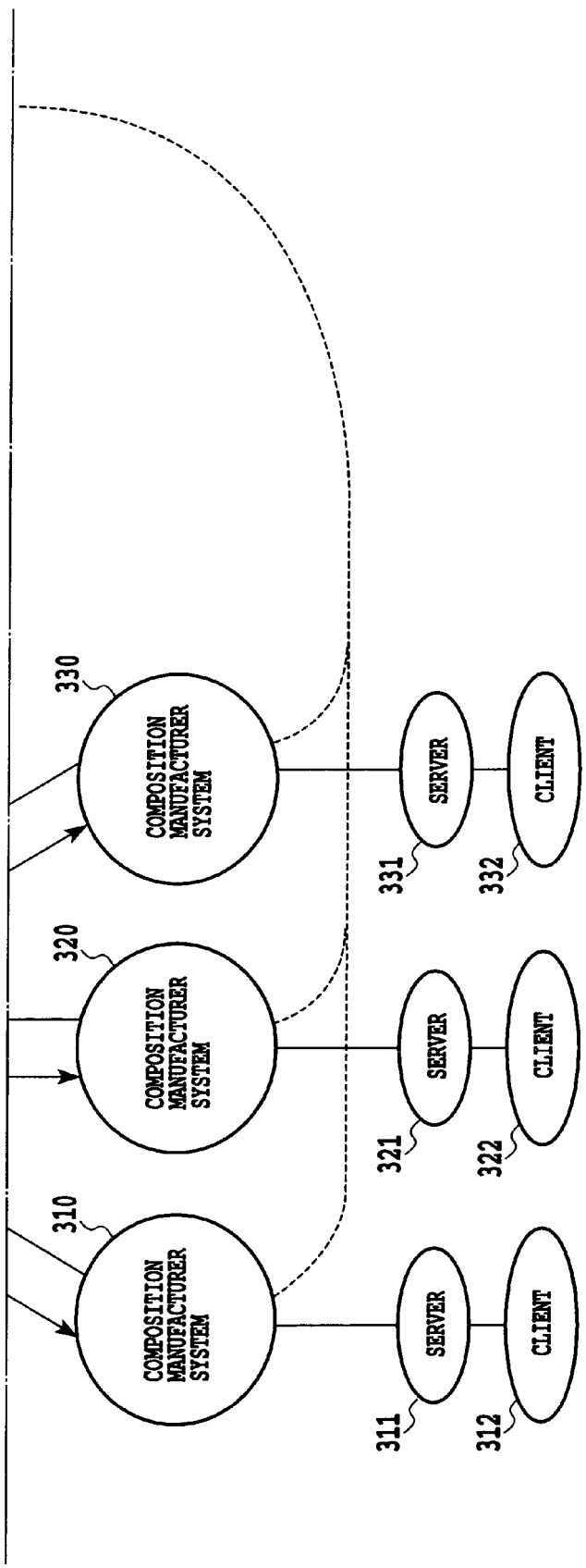
FIG. 4B is a block diagram of the configuration of the system according to another embodiment of the present invention.

FIG. 4 shows the entire configuration of the medicine (pharmaceutical) prototype support system applicable to the embodiment described later. In FIG. 4, the computer system 100 used by a product manufacturer (hereinafter referred to simply as a product manufacturer system), includes main ingredient information about medicines so that new medicines can be developed. Normally, the product composition contained in medicines contains an ingredient having efficacy (main ingredient), a composition ingredient having efficacy (main ingredient), and a composition ingredient having no efficacy, but required in preparing and designing medicines. The product manufacturer system has a communications server 101 and one or more client 102 LAN-connected to the communications server 101. The communications server 101 transfers the information transmitted from the client 102 to the ingredient manufacturer system 200. The client 102 can use a personal computer, etc., and is loaded with a browser for browsing electronic mail software and/or a home page (HTML document, etc.). The client 102 inputs information to be transmitted to the client of other systems described later, and displays the information received from other systems.

The ingredient manufacturer system 200 is an ingredient manufacturer system used by an ingredient manufacturer, and comprises a communications server 201 and a plurality of clients 202 LANN-connected to the communications server 201. The functions of the communications server 201 and the clients 202 are considered to be similar to those of the communications server 101 and the 102. In the communications server 201, the internal storage device such as a hard disk storage device stores the information (generally referred to as property information) to be provided for the product manufacturer such as the properties depending on the type of composition ingredient and the manufacturing method (product process information) of the composition manufacturer, the information relating to the incompatibility between the main ingredient and the composition ingredient, and the information about the optimum composition ingredient for the product process information as a database (composition ingredient determination means, information conversion means).

The communications server 201 is loaded with an estimating program for calculation of the manufacture price and manufacture condition according to the information about the type and amount of composition ingredient, etc.

An estimating program can be designed to calculate the manufacture cost by the calculation expression obtained by predetermining a calculation expression for the manufacture cost using the quantity as a parameter for each type of composition ingredient.

Systems 310, 320, 330, . . . are used by a plurality of composition manufacturers, and comprise communications servers 311, 321, 331, . . . , and a plurality of clients 312, 322, 332 LAN-connected to the communications servers 311, 321, 331, . . . . The functions of the communications servers 311, 321, and 331 and the clients 312, 322, and 332 are similar to those of the communications server 101 and the client 102.

The exemplary prototype support system further includes a communications network 400 capable of connecting the systems 100 to 330.This communications network can comprise a well-known communications network, such as, for example, a dedicated telephone line, the Internet, or other known wireless or cable networks.

Third Embodiment

The procedure according to the third embodiment is explained by referring to FIG. 4.
(Process 1)

The staff of a product manufacturer inputs a written request from the client 102, that is, a written request (<1> shown in FIG. 4A) for providing a product composition to attain the desired properties of the product X including a manufactured main ingredient X1 and a manufacturing method, and transmits it to the ingredient manufacturer system 200 through the server 101. A request item from the product manufacturer can be the designation of the main ingredient X1, a desired item value of a product, a product style, a desired product cost, restrictions on the manufacture condition, restrictions on a used ingredient, or other desired design parameters.

When it is difficult for an ingredient manufacturer to obtain the main ingredient X1, it is necessary for a product manufacturer to provide the main ingredient X1 for an ingredient manufacturer. When the product manufacturer cannot externally offer an ingredient under a development stage, a substance similar in properties to the main ingredient X1 is provided or the property information necessary in designing medicines can be provided to the ingredient. Furthermore, a request for a style (placebo) in which preparation and design can be performed only using the composition ingredient excluding the main ingredient X1 from the medicines X. They are different in request cost relating to the manufacture of a prototype because they are related to the disclosure of confidential information, difficulty in preparation and design, and the development speed.
(Process 2)

A sales staff of an ingredient manufacturer receives a written request at the clients 202 through the communications server 201. The sales staff uses one or more of clients 202 to input a retrieval request about the composition ingredient relating to the medicine X described in the written request for the communications server 201 (<2> shown in FIG. 4). The composition information database in the communications server 201 of the ingredient manufacturer system 200 stores the main ingredient X1 and the main ingredient X'1 similar to the main ingredient X1, various composition manufacture information including the composition ingredient X2 manufactured by the ingredient manufacturer, and information (composition information) relating to the preparing manufacture condition using the properties attained by them, the main ingredient X1 and X'1 (<3> shown in FIG. 4). Then, the optimum composition ingredient X2 related to the X1 information can be detected. Thus, the properties of an estimated product are determined. Then, the sales staff inputs information (information about composition ingredient, quantity, etc.) for estimation from the clients 202, uses an estimating program of the communications server 201, and calculates the prototype manufacture cost, and the product cost. To calculate the cost, a cost calculation database is prepared depending on the prototype development speed, the difficulty in pharmaceutical designing, and the security of the main ingredient. When the product has legal restrictions on a substance available as a composition ingredient, the composition and the production cost should be determined within the range of the restrictions.

(Process 3)

The information about the determined estimated product properties, the prototype product cost, and the production cost is input from the clients 202, and transmitted to the client 102 of the staff of product manufacture of the product manufacturer through the communications servers 201 and 101 (<5> shown in FIG. 4).

(Process 4)

The staff of product manufacture considers the transmitted estimated product property and sales cost to prepare a written request for prototype manufacture. A written request for prototype manufacture (<6> shown in FIG. 4) is input from the client 102, and transmitted to the clients 202 of the sales staff of the ingredient manufacturer through the communications servers 101 and 201.

(Process 5)

The sales staff of the ingredient manufacturer appropriately divides the prototype manufacture process, and generates a written request for prototype manufacture for each of the divided processes, assigns the written request for prototype manufacture to a plurality of composition manufacturers, and transmits the written request for prototype manufactures to the clients 312, 322, and 332 of the staffs of the composition manufacturers through the communications servers 201, 311, 321, and 331 (<7> shown in FIG. 4).

At this time, the ingredient manufacturer discloses a necessary product composition and its manufacture condition for each process. The important point is that the information about the main ingredient X1 is not disclosed, but the main ingredient X'1 is disclosed depending on the confidential rank and the main ingredient X"1 obtained by information converting the main ingredient X1 or the main ingredient X'1 obtained by the information conversion means can be disclosed. The information conversion means is contained in the system of the ingredient manufacturer, and the main ingredient X1 information cannot be estimated from the main ingredient X1 information whose confidentiality to be maintained, or there is a database (information conversion database) for conversion into hardly estimated main ingredient X'1 and main ingredient X"1. An example of the conversion can be, in the preparation development using a verapamil hydrochloride (X1) which is a vasoconstrictor, dilazep hydrochloride (X'1) is selected. The dilazep hydrochloride as well as verapamil hydrochloride is a vasoconstrictor, and is selected because it indicates a similar solubility level "sparingly soluble". From the similarity in solubility which is the main factor affecting the particle-generating process in the preparing process, the acetaminophen (X"1) which is an antifebrile is selected. It is impossible to estimate the development of the verapamil hydrochloride from the acetaminophen.

For example, the ingredient manufacturer offers the information about other composition ingredients including the main ingredient X'1 and composition ingredient X2 for the composition manufacturer including the communications server 311. The ingredient manufacturer discloses to the composition manufacturer having the communications server 321 the properties (does not disclose the information about the main ingredient X1) required in the manufacturing process of the process 2 prototype X requested by the composition manufacturer having the communications server 321 relating to the process 1 prototype X prepared from other composition ingredients including the main ingredient X'1 and the composition ingredient X2. Furthermore, the ingredient manufacturer discloses the information about the process 2 prototype X and requests the composition manufacturer having the 331 to manufacture a prototype X. The servers 311, 321, and 331 perform a monitoring operation not to make double requests to generate a prototype in the same process. For example, assume that a particle is generated using the main ingredient X'1 and other composition ingredients containing the composition ingredient X2, and a process 1 prototype X is obtained. Using the process 1 prototype X, a tablet is generated as a process 2 prototype X. The coated tablet obtained by coating the process 2 prototype X is a process 3 prototype X.

When the ingredient manufacturer requests the composition manufacturer to manufacture a prototype, it is preferable for the ingredient manufacturer to execute a security contract with the composition manufacturer, even though it is guaranteed that the information related to the main ingredient X1 can be protected against disclosure to the composition manufacturer. Such a security contract can, for example, ensure the confidentiality of the product composition, manufacture condition, etc. Furthermore, an ingredient manufacturer can also manufacture a prototype. In this case, the manufacturing department, etc. belonging to the ingredient manufacturer functions as a composition manufacturer as shown in FIG. 4. Furthermore, the costs for generating a process 1 prototype X, a process 2 prototype X, and a process 3 prototype X are determined.

(Process 6)

The composition manufacturer receives a request to manufacture a prototype, manufactures it, and delivers it to the ingredient manufacturer (refer to the dotted lines a, b, and c shown in FIG. 4).

(Process 7)

The ingredient manufacturer measures the properties of the prototypes (process 1 prototype X, process 2 prototype X, and process 3 prototype X). In some cases, the composition manufacturer measures the property values of the prototype, and can deliver the prototype including the information. The process 6 in this case is performed by the composition manufacturer.

(Process 8)

The ingredient manufacturer provides a prototype for a product manufacturer (refer to the dotted line shown in FIG. 4.). The information (<8> shown in FIG. 4) about the (measured) properties of the prototype is transmitted from the clients 202 of the sales staff of the ingredient manufacturer to the client 102 of the product manufacturer. At this time, it is noticeable that the information about the composition and the manufacturing method are not disclosed. If a prototype is analyzed, and the composition and the manufacture condition are easily estimated, it is necessary to take action like a contract etc. not to analyze the product composition between the product manufacturer and the ingredient manufacturer.

(Process 9)

The product manufacturer measures the properties of the provided prototype, and determines whether or not the disclosure of the information about the composition and manufacture condition of prototype is required (the disclosure of the information about the composition and the manufacture condition of a prototype is requested). Then, the result is transmitted to the clients 202 as a sales staff of the ingredient manufacturer (refer to <9> shown in FIG. 4).

(Process 10)

When the ingredient manufacturer receives a notification from the manufacture staff of the product manufacturer that the information is to be disclosed, the sales staff discloses the information by transmitting the information about the product composition and the manufacture condition of a prototype from the clients 202 to the client 102.

When the product manufacturer manufactures a product, the order (manufacture request as indicated by <10> shown in FIG. 4) of the composition ingredient X2 sold by the ingredient manufacturer is made from the client 102 of the manufacture staff to the clients 202 as the sales staff. The ingredient manufacturer receives the order, and manufactures the composition ingredient X2, or sells it when there is the ingredient in stock. When the product manufacturer does not manufacture the product, it can be committed on the composition manufacturer. The commission can be performed through an online operation.

The prototype is provided and the payment and the reception of the price for the related information, etc. occur at any time depending on each style. For example, before starting the manufacture of a prototype, the estimated property value and a sales cost are presented to the product manufacturer, and the payment and reception of the price for the preparation of a prototype can occur. Furthermore, when the property information and manufacturing method information are to be purchased after presenting a prototype, the payment and reception of the price also occur. Additionally it is natural that the exchange of the price for the manufacture of a prototype occurs between the product manufacturer and the ingredient manufacturer.

These prices can be processed online (that is, accounting process). Practically, the communications server 101 of the product manufacturer system performs the process of transferring the amount set in advance to the bank account of the ingredient manufacturer each time necessary information is received from the ingredient manufacturer system 200. The payment of a fund can be performed by a bank transfer or using electronic money, etc.

INDUSTRIAL APPLICABILITY

As described above, according to the present invention, the composition manufacturer can efficiently obtain necessary information for manufacturing a new product by cooperating with other manufacturers. Therefore, the transactions among the manufacturers can be quickly performed. Furthermore, the product manufacturer discloses the main ingredient only to the ingredient manufacturer, and the ingredient manufacturer can manufacture the final product without disclosing it to a composition manufacturer by dividing the product into plural pieces, thereby maintaining the security for the product manufacturer.

The invention claimed is:

1. A medicine prototype support system for an ingredient manufacturer developing a medical product including a confidential first main ingredient at a request of a product manufacturer comprising:

one or more computer processors;

a database using a storage device for storing main medical product ingredient information comprising at least information regarding the confidential first main ingredient and information regarding a second main ingredient, the information regarding the confidential first main ingredient being confidential information of the product manufacturer;

communication means for receiving main ingredient information from the database;

information conversion means using at least one of the one or more computer processors for converting main ingredient information to be transmitted to a computer system of a composition manufacturer from information regarding the confidential first main ingredient included in a request from a product manufacturer to information regarding the second main ingredient stored in the database by selecting an intermediate main ingredient having one or more material properties similar to the confidential first main ingredient and then selecting a second main ingredient having one or more material properties similar to the intermediate main ingredient, but having a different pharmacological effect than the confidential first main ingredient;

composition ingredient determination means using at least one of the one or more computer processors for selecting a composition ingredient; and communication means for transmitting information regarding the selected second main ingredient and the selected composition ingredient to the computer system of the composition manufacturer, wherein the medicine prototype support system is configured to receive a first request for prototype manufacture, including the information regarding the confidential first main ingredient, from a computer system of the product manufacturer, to select the second main ingredient using the information conversion means, to select the composition ingredient using the composition ingredient determination means, and to transmit a second request for prototype manufacture including the information regarding the selected second main ingredient and the selected composition ingredient to a computer system of the composition manufacturer, so that the confidential first main ingredient information received from the computer system of the product manufacturer is not transmitted to the computer system of the composition manufacturer.

2. A medicine prototype support system for an ingredient manufacturer developing a medical product including a confidential first ingredient at a request of a product manufacturer comprising:

one or more computer processors;

a database using a storage device for storing main medical product ingredient information comprising at least confidential first main ingredient information and second main ingredient information, the first confidential main ingredient information being confidential information of the product manufacturer and the second main ingredient information being non-confidential;

information conversion software that converts main ingredient information to be transmitted to a computer system of a composition manufacturer from information regarding the confidential first main ingredient included in a request from the product manufacturer to information regarding the second main ingredient stored in the database by selecting an intermediate main ingredient having one or more material properties similar to the confidential first main ingredient and then selecting a second main ingredient having one or more material properties similar to the intermediate main ingredient, but having a different pharmacological effect than the confidential first main ingredient;

composition ingredient determination software that selects composition ingredient information based on one or more properties of the confidential first main ingredient or the selected second main ingredient; and a server for transmitting information regarding the selected second main ingredient and the selected composition ingredient to a computer system of a composition manufacturer, wherein the medicine prototype support system is configured to receive a first request for prototype manufacture, including information regarding the confidential first main ingredient, from the product manufacturer, to select the second main ingredient using the information conversion software, to select the composition ingredient using the composition ingredient determination software, and to transmit a second request for prototype manufacture including information regarding the second main ingredient and the composition ingredient to the composition manufacturer system, so that the information regarding the confidential first main ingredient received from the computer system of the product manufacturer is not transmitted to the computer system of the composition manufacturer.

3. A method of using a medicine prototype support system comprising the steps of:

receiving a first request for prototype manufacture of a medical product including a confidential first main ingredient from a computer system of a product manufacturer via a communications server, the request including medical product information regarding the first main ingredient that is confidential information of the product manufacturer;

storing the confidential first main ingredient and confidential medical product information in a database contained in a storage device, using the database to convert the main ingredient information to be transmitted to a computer system of a composition manufacturer from information regarding the confidential first main ingredient and confidential medical product information included in the request from the product manufacturer to information regarding a second main ingredient stored in the database by selecting an intermediate main ingredient having one or more material properties similar to the first main ingredient and then selecting a second main ingredient having one or more properties similar to the intermediate main ingredient, but having a different pharmacological effect than the confidential first main ingredient;

determining a composition ingredient based on the confidential main ingredient information or the selected second main ingredient information;

transmitting a second request for prototype manufacture to a computer system of a composition manufacturer via the communications server, the request for prototype manufacture including the identities of the selected second main ingredient and the selected composition ingredient; and maintaining the confidentiality of the confidential first main ingredient information by not transmitting the confidential first main ingredient information to the computer system of the composition manufacturer.

4. The method of claim 3, further comprising transmitting a second request for prototype manufacture to a second composition manufacturer.

5. The method of claim 3, wherein the confidential main ingredient information received from the product manufacturer includes the identity of the main ingredient.

6. A medicine prototype support system for an ingredient manufacturer developing a medical product including a confidential first main medical product ingredient at a request of a product manufacturer comprising:

one or more computer processors;

a database using a storage device for storing main ingredient information comprising at least information regarding a confidential first main medical product ingredient and information regarding a second main ingredient, the information regarding the confidential first main medical product ingredient being confidential information of the product manufacturer;

information conversion means using at least one of the computer processors for converting main ingredient information to be transmitted to a computer system of a composition manufacturer from information regarding the confidential first main ingredient included in a request from the product manufacturer to information regarding the second main ingredient stored in the database by selecting an intermediate main ingredient having one or more material properties similar to the first main ingredient and then selecting a second main ingredient having a different pharmacological effect than the confidential first main ingredient by comparing properties of the intermediate main ingredient information stored in the database with properties of a plurality of potential second main ingredients stored in the database;

composition ingredient determination means for selecting a composition ingredient based on one or more properties of the confidential first main ingredient or the selected second main ingredient; and communication means for receiving information regarding the confidential first main ingredient from the product manufacturer and for transmitting information regarding the selected second main ingredient and the selected composition ingredient to the composition manufacturer system, wherein the medicine prototype support system does not reveal the identity of the confidential first main ingredient to the composition manufacturer system.

* * * * *